(12) United States Patent
Labutov et al.

(10) Patent No.: US 11,100,429 B2
(45) Date of Patent: Aug. 24, 2021

(54) SYSTEM AND METHOD FOR CREATING ELECTRONIC DOCUMENT CHRONOLOGIES USING MACHINE LEARNING

(71) Applicant: The Joan and Irwin Jacobs Technion-Cornell Institute, New York, NY (US)

(72) Inventors: Igor Labutov, New York, NY (US); Bishan Yang, New York, NY (US); Vishakh Padmakumar, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days.

(21) Appl. No.: 16/728,817

(22) Filed: Dec. 27, 2019

(65) Prior Publication Data
US 2021/0200742 A1    Jul. 1, 2021

(51) Int. Cl.
| | |
|---|---|
| *G06N 20/00* | (2019.01) |
| *G06N 5/04* | (2006.01) |
| *G06F 40/295* | (2020.01) |
| *G06F 16/2452* | (2019.01) |
| *G06F 16/21* | (2019.01) |
| *G06F 40/197* | (2020.01) |

(52) U.S. Cl.
CPC .......... *G06N 20/00* (2019.01); *G06F 16/212* (2019.01); *G06F 16/24526* (2019.01); *G06F 40/197* (2020.01); *G06F 40/295* (2020.01); *G06N 5/04* (2013.01)

(58) Field of Classification Search
CPC ........ G06N 20/00; G06N 5/04; G06F 40/197; G06F 16/24526; G06F 16/212
See application file for complete search history.

(56) References Cited

U.S. PATENT DOCUMENTS

| | | | |
|---|---|---|---|
| 8,706,742 B1 | 4/2014 | Ravid et al. | |
| 10,839,021 B2 * | 11/2020 | Kleiman-Weiner | ..... G06N 5/00 |
| 2006/0031199 A1 | 2/2006 | Newbold et al. | |
| 2009/0199090 A1 * | 8/2009 | Poston | .................. G06Q 10/10 |
| | | | 715/255 |
| 2013/0185252 A1 * | 7/2013 | Palmucci | .............. G06F 40/197 |
| | | | 707/608 |

(Continued)

*Primary Examiner* — Asher D Kells
(74) *Attorney, Agent, or Firm* — M&B IP Analysts, LLC

(57) ABSTRACT

A system and method for creating an electronic document chronology. The method includes applying a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities; and creating a document chronology graph based on the plurality of connecting events, wherein the document chronology graph includes a plurality of nodes and a plurality of edges, wherein each node represents one of the plurality of entities, wherein each edge represents one of the plurality of connecting events.

17 Claims, 5 Drawing Sheets

(56) References Cited

U.S. PATENT DOCUMENTS

| | | | |
|---|---|---|---|
| 2014/0071135 A1* | 3/2014 | Morsi | G06T 11/206 345/440 |
| 2014/0074770 A1* | 3/2014 | Morsi | G06F 16/9024 707/600 |
| 2014/0281873 A1* | 9/2014 | Frew | G06F 11/30 715/229 |
| 2015/0012448 A1 | 1/2015 | Bleiweiss et al. | |
| 2018/0136933 A1* | 5/2018 | Kogan | G06F 16/26 |
| 2018/0157662 A1* | 6/2018 | Chin | G06F 16/9038 |
| 2019/0294669 A1 | 9/2019 | Mohan | |
| 2020/0125648 A1* | 4/2020 | Jiang | G06F 16/285 |
| 2020/0250562 A1* | 8/2020 | Bly | G06N 7/005 |
| 2020/0257709 A1* | 8/2020 | Bull | G06F 16/3347 |
| 2020/0257712 A1* | 8/2020 | Singh | G06F 16/93 |

* cited by examiner

SYSTEM AND METHOD FOR CREATING ELECTRONIC DOCUMENT CHRONOLOGIES USING MACHINE LEARNING

TECHNICAL FIELD

The present disclosure relates generally to tracking modifications to electronic documents, and more specifically to constructing chronologies of electronic documents.

BACKGROUND

In both small and large companies, many new electronic documents may be created daily. These electronic documents may have cryptic or otherwise vague titles such as:
  weekly_report_10_19_01_final.pdf
  weekly_report_10_19_01_final_final.pdf
  weekly_report_10_19_01_final_final_small_change.pdf Although programs such as Microsoft Word® provide features for tracking changes, the tracked changes may be lost when, for example, converting to other formats (e.g., when converting to a PDF file). Additionally, any contextual information related to changes is not tracked. For example, an assistant may implement a change at the direction of a boss. However, any tracked changes for a document modified by the assistant would suggest that the assistant made the change even though the boss was the actual person who decided to make the change.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for creating an electronic document chronology. The method comprises: applying a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities; and creating a document chronology graph based on the plurality of connecting events, wherein the document chronology graph includes a plurality of nodes and a plurality of edges, wherein each node represents one of the plurality of entities, wherein each edge represents one of the plurality of connecting events.

Certain embodiments disclosed herein also include a non-transitory computer readable medium having stored thereon causing a processing circuitry to execute a process, the process comprising: applying a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities; and creating a document chronology graph based on the plurality of connecting events, wherein the document chronology graph includes a plurality of nodes and a plurality of edges, wherein each node represents one of the plurality of entities, wherein each edge represents one of the plurality of connecting events.

Certain embodiments disclosed herein also include a system for creating an electronic document chronology. The system comprises: a processing circuitry; and a memory, the memory containing instructions that, when executed by the processing circuitry, configure the system to: apply a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities; and create a document chronology graph based on the plurality of connecting events, wherein the document chronology graph includes a plurality of nodes and a plurality of edges, wherein each node represents one of the plurality of entities, wherein each edge represents one of the plurality of connecting events.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
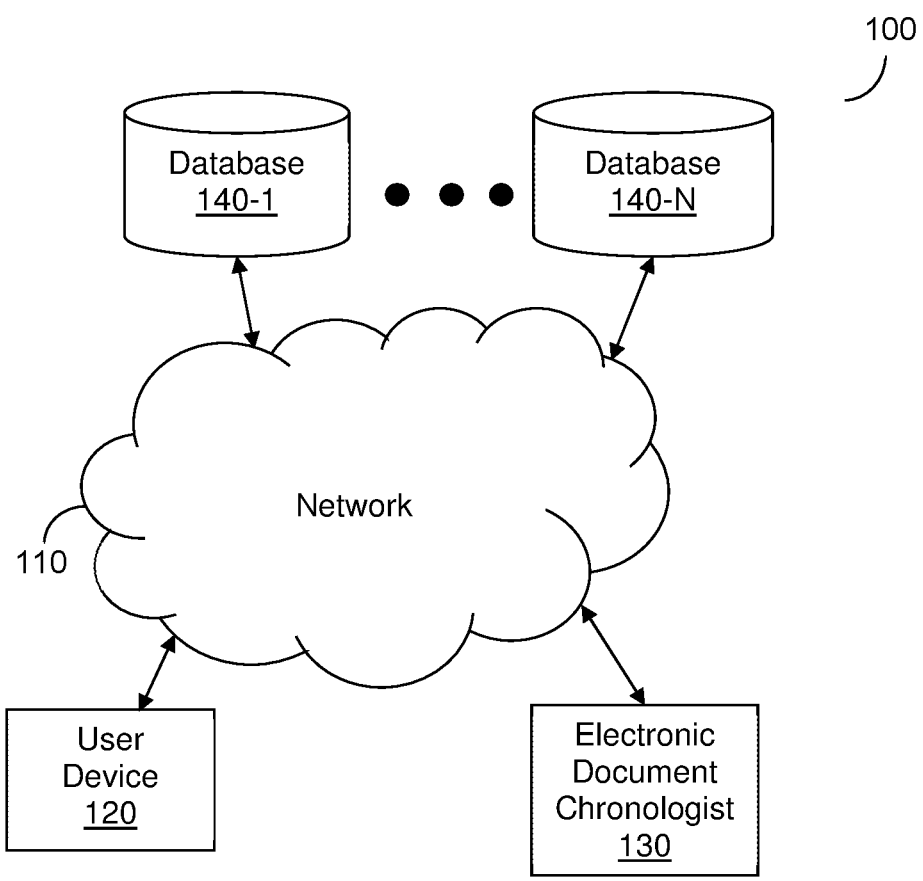
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that machine learning can provide a suitable mechanism for constructing document chronologies due to the variety of metadata and communications data that can be correlated to the electronic document. More specifically, it has been identified that machine learning may be utilized to automatically recognize the contextually-notable events in the electronic document's history and to organize the data with respect to a chronology of changes. To this end, the disclosed embodiments provide techniques for training and applying a machine learning model to identify connecting events between entities related to document creation and modification. These identifications of connecting events allow for constructing a representation such as a graph that demonstrates a chronology of an electronic document.

The various disclosed embodiments include a method and system for creating document chronologies using machine learning and, specifically, using supervised learning. A machine learning model is trained based on a labeled training set including training electronic document change data, training entity identifiers, and training labels indicating training connecting events between training entities. When the machine learning model has been trained, potential entities are identified in application data related to document modification. Potential entity identifiers and application electronic document change data are input to the machine learning model in order to output relationships among the entities.

The identified relationships among entities may be utilized in providing automated document chronology services. To this end, in an embodiment, the determined relationships among entities are utilized to construct a document chronology graph representing relationships among the entities with respect to connecting events. In the document chronology graph, each entity is represented as a node and each connecting event is represented as an edge between nodes in the graph.

It has been further identified that creation of a labeled training set which requires manual labeling of relationships between entities as required by the disclosed embodiments is cumbersome. Accordingly, the disclosed embodiments further provide techniques for efficiently creating a labeled training set to be used for machine learning. More specifically, the disclosed embodiments provide techniques for filtering potential pairs of entities to be presented for labeling by a user. To this end, entity pair filtering rules may be applied prior to presentation of the potential entity pairs via a graphical user interface in order to efficiently obtain labels based on the filtered entity pairs. Thus, the disclosed embodiments further include techniques for improving efficiency of user interactions with a graphical user interface for the purpose of labeling data to be used as training data.

FIG. 1 shows an example network diagram 100 utilized to describe the various disclosed embodiments. In the example network diagram 100, a user device 120, an electronic document chronologist 130, and a plurality of databases 140-1 through 140-N (hereinafter referred to individually as a database 140 and collectively as databases 140, merely for simplicity purposes) are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving and displaying electronic document chronologies, labeling questions, information provided by a virtual assistant, and the like. The user device 120 may further include or be connected to a user interface (not shown) for accepting inputs such as, but not limited to, responses to labeling questions, requested information, and the like. The user interface may include, but is not limited to, a touchscreen, a mouse, a keyboard, a microphone, a motion-based interface (e.g., a camera and corresponding motion analyzer), combinations thereof, and the like.

The electronic document chronologist 130 is configured to create electronic document chronologies for electronic documents as described herein. More specifically, in an embodiment, the electronic document chronologist 130 is configured to apply a machine learning model to features extracted from entity identifiers and electronic document change data. In a further embodiment, the electronic document chronologist 130 may be configured to train the machine learning model.

Based on the output of the machine learning model, connecting events representing electronic document changes are determined. The electronic document chronologist 130 is further configured to create a document chronology graph based on the connecting events. The document chronology graph includes nodes and edges, where each node represents an entity and each edge represents one of the connecting events. Further, because the machine learning model is trained to identify connecting events based on answers to a questionnaire, each edge determined based on application of the machine learning model to new electronic document change data further represents an answer to a question (e.g., a connecting event indicating that a person edited an electronic document is the answer to the question "Who edited the electronic document?"). Thus, responses to questions about electronic document chronology may be determined based on the edges.

The electronic documents for which chronologies are created are discrete files including electronic media content. Non-limiting examples for the electronic documents include text files, word processor files, other file types (e.g., Adobe PDF), and the like.

In some implementations, the electronic document chronologist 130 is configured to provide a virtual assistant (for example, to the user device 120). The virtual assistant provides data related to the document chronology graph based on requests for document chronology information. Each request identifies an electronic document (e.g., by providing an identifier of the electronic document or attaching the electronic document) and requests information related to the electronic document chronology.

The document chronology information may include, but is not limited to, answers to specific questions regarding changes made to the document, a complete document chronology for an electronic document, and the like. The answers may include information such as, but not limited to, identity of an entity that approved an electronic document, identity of an entity that made a change to an electronic document, identity of an entity that created an electronic document, identity of an entity that signed an electronic document, relationship between two electronic documents (e.g., different versions of the same document, different documents that are of the same type such as monthly reports from different months, the same document in different file formats such as a text file and a portable document format file, and the like).

The virtual assistant may further provide information related to patterns of change among related documents. As a particular example, periodic documents (e.g., monthly reports) may be compared or aggregated in order to determine such information. Documents may be identified as related based on the graph and, in particular, based on the connecting events. In a further implementation, related documents used for determining patterns of change include different documents having the same type.

The electronic document chronologist 130 may be further configured to send labeling questions, instructions for providing a dynamic labeling questionnaire, or both, for display on the user device 120. The electronic document chronologist 130 trains a machine learning model using responses to the labeling questions as labels in a training data set.

It should be noted that the embodiments described herein are not limited to the particular configuration illustrated in FIG. 1, and that different configurations may be utilized without departing from the scope of the disclosure. In particular, in some implementations, the training of the machine learning model may be performed by a separate system from the electronic document chronologist 130 (separate system not shown in FIG. 1). Also, in some implementations, any or all of the components shown in FIG. 1 may communicate directly rather than through a network.

Figure 2:
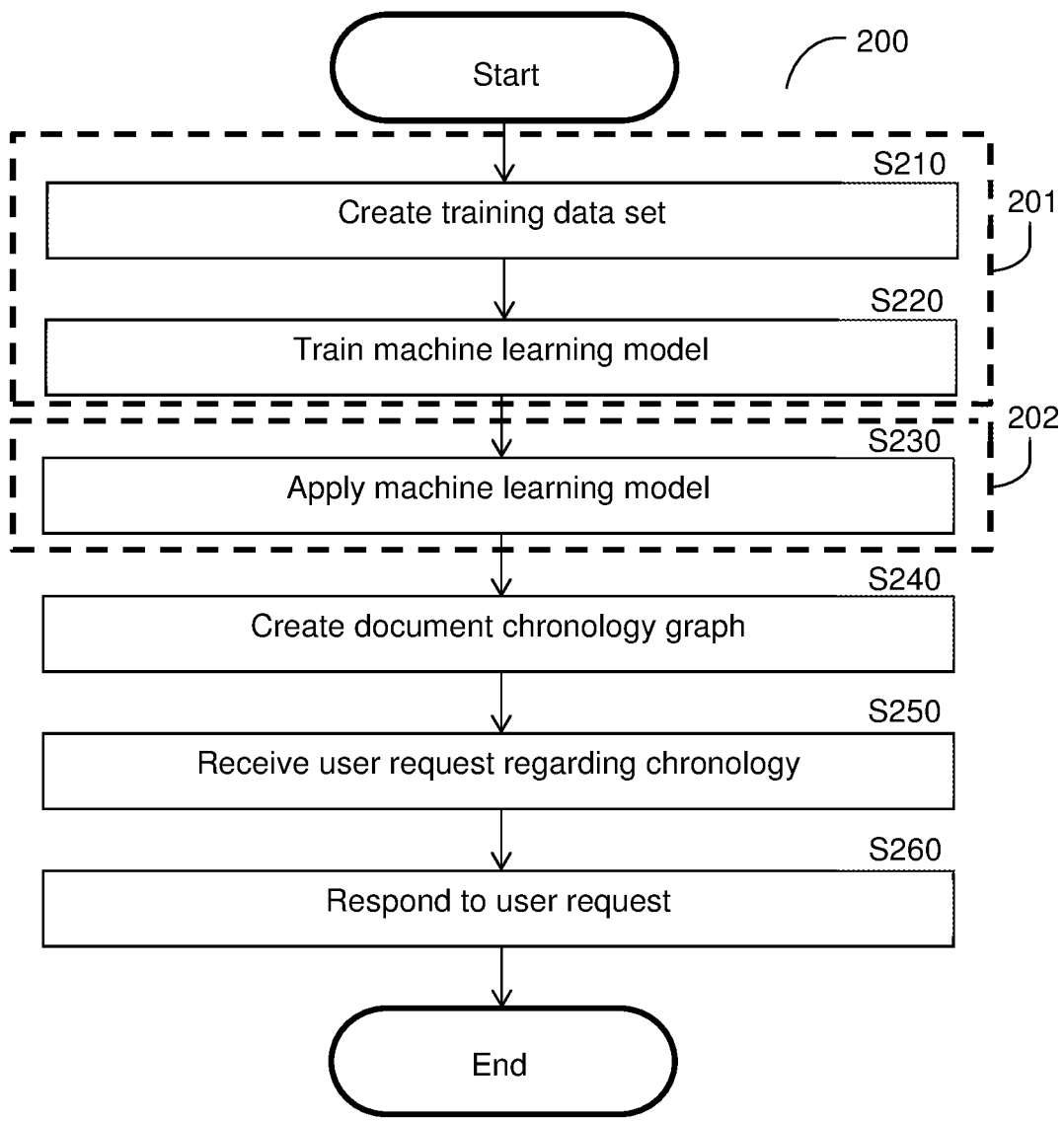
FIG. 2 is a flowchart illustrating a method for creating an electronic document chronology according to an embodiment.

FIG. 2 is an example flowchart 200 illustrating a method for creating an electronic document chronology according to an embodiment. In an embodiment, the method is performed by the electronic document chronologist 130, FIG. 1. In an example implementation, the method includes a training phase 201 and an application phase 202.

In the training phase 201, at S210, a training data set is created. In an embodiment, the training data set includes training entity identifiers, training electronic document change data, and training labels indicating connecting events between training entities. The labels may be created by providing electronic document change data to a user and receiving inputs indicating information related to the connecting events between training entities.

Electronic document change data includes data related to changes made to an electronic document. The changes may include, but are not limited to, modifying the electronic document, approving the electronic document, creating a new electronic document, saving a new file including a different version of the same electronic document, and the like. The electronic document change data may further include data related to similar electronic documents such as electronic documents that are the same type but different. As a non-limiting example, two electronic documents may be monthly reports including monthly sales data but for different months (i.e., they are not versions of the same document but rather different documents with similar content).

The electronic document change data may include, but is not limited to, electronic documents, communications including electronic documents (e.g., emails including electronic documents as attachments), and the like. Each training entity is an electronic document or a changing entity (e.g., a person or group of people) that made a change to an electronic document. The entity identifiers uniquely identify entities and may include, but are not limited to, names, identifier numbers, email addresses, network addresses, and the like.

As noted above, it has been identified that labeling data sets is time and labor intensive, and may require sending and displaying a large amount of data. To this end, in a further embodiment, the training data set may be created as described with respect to FIG. 3. Specifically, filtering may be performed to reduce the number of items displayed to a user.

Figure 3:
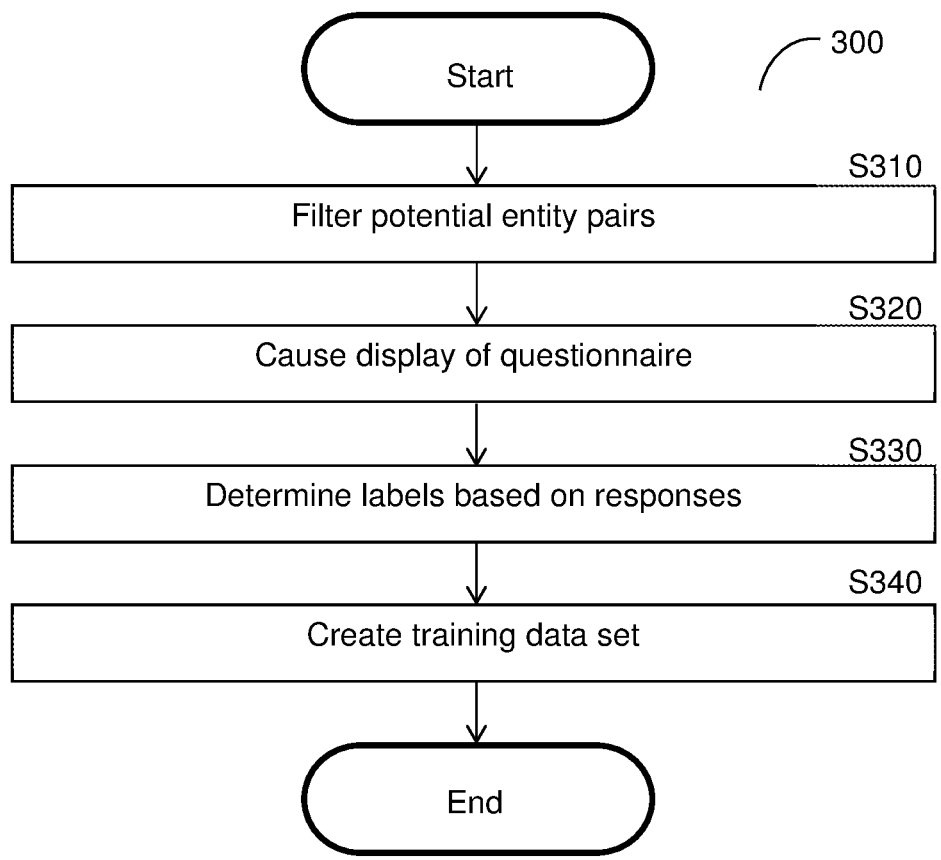
FIG. 3 is a flowchart illustrating a method for training a machine learning model according to an embodiment.

FIG. 3 is an example flowchart 300 illustrating a method for training a machine learning model according to an embodiment. In an embodiment, the method is performed by the electronic document chronologist 130, FIG. 1.

At S310, potential entity pairs are filtered. In an embodiment, S310 includes applying one or more pair filtering rules to the potential entity pairs to determine candidate entity pairs. Each potential entity pair includes two training entities and, more specifically, two training electronic document entities such that the training questionnaire is based on pairs of electronic documents.

In an embodiment, the pair filtering rules are defined with respect to similarity between electronic documents such that only electronic documents having similarities above a threshold are retained after filtering. The similarity may be a statistical similarity determined based on content, structure, or both, of the electronic documents.

At S320, a questionnaire is caused to be displayed (for example, on the user device 120, FIG. 1) with respect to each of the candidate entity pairs. The questionnaire includes questions regarding the training electronic document change data indicating changes made to the electronic document.

In an embodiment, the questionnaire is a dynamic questionnaire. A response to each question of the dynamic questionnaire is utilized to determine the next question. This allows for further filtering the amount of information needing to be displayed to the user and responded to by asking questions that are more likely to be relevant based on prior responses.

At S330, labels are determined based on responses to the questionnaire. The labels indicate connecting events. Such connecting events may include, but are not limited to, an entity making a change to an electronic document, an entity approving an electronic document, an entity creating a new electronic document, an electronic document being a different version of another electronic document, two electronic documents being the same type, and the like.

At S340, a training data set is created using the determined labels. The training data set includes training entity identifiers, training electronic document change data, and training labels indicating connecting events between training entities.

Returning to FIG. 2, at S220, a machine learning model is trained using the training data set. The machine learning model, when trained using the training set, In the application phase, at S230, the machine learning model is applied to an application data set in order to determine connecting events representing changes to electronic documents with respect to pairs of entities. The application data set includes application entity identifiers and application electronic document change data.

At S240, based on the connecting events, a document chronology graph is created. The document chronology graph includes nodes and edges. Each node represents one of the entities identified by the application entity identifiers. Each edge represents one of the connecting events determined by applying the machine learning model.

Figure 5:
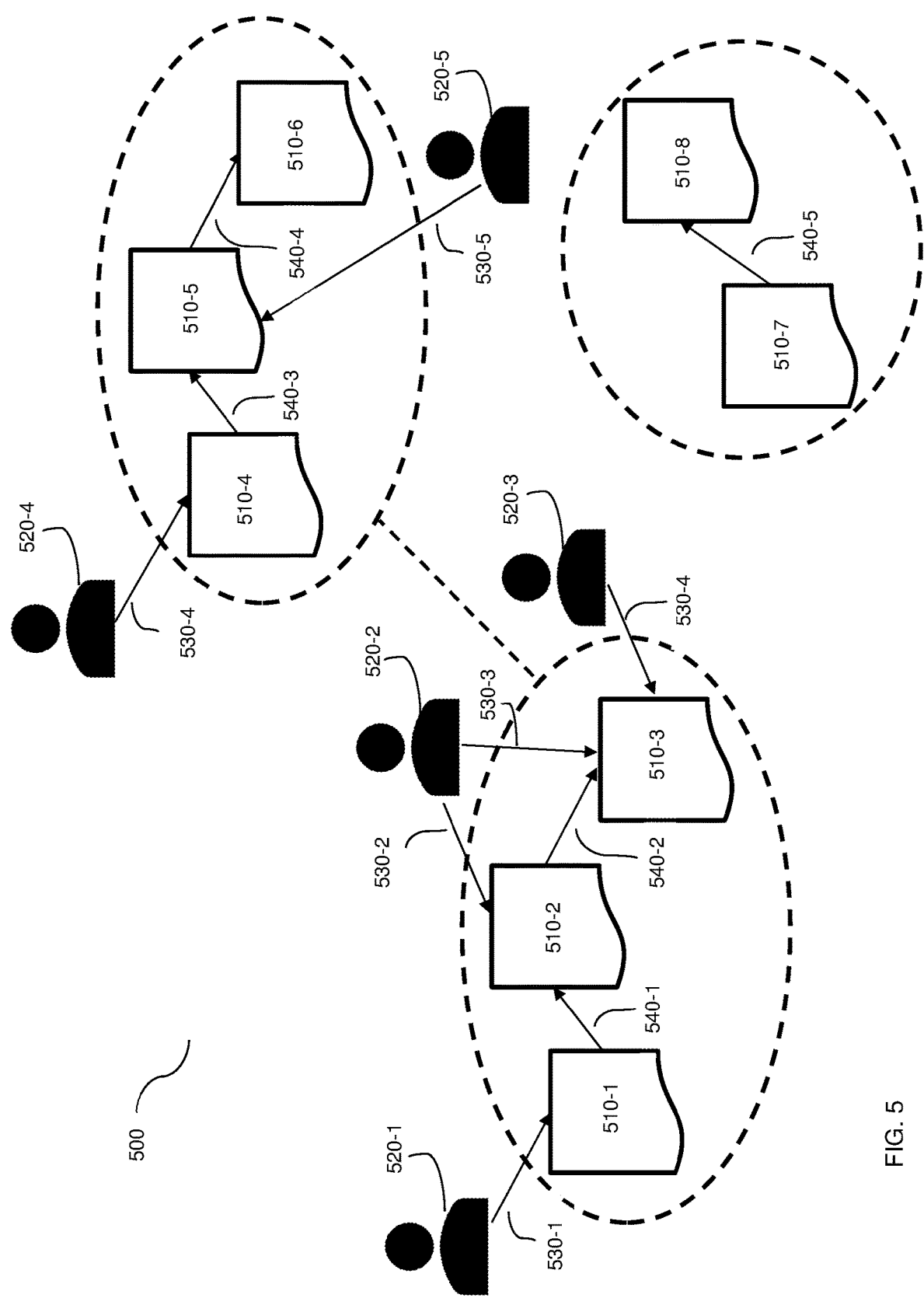
FIG. 5 is an illustration showing a visual representation of a document chronology graph.

FIG. 5 is an example visual illustration 500 representing a document chronology graph. The visual illustration 500 includes electronic document entity nodes 510-1 through 510-8, changing entity nodes 520-1 through 520-5, and edges 530-1 through 530-5 and 540-1 through 540-4.

The edges 530 represent connecting events between an electronic document represented by one of the nodes 510 and a changing entity represented by one of the nodes 520. Thus, each edge 530 represents an entity such as a person interacting with an electronic document (e.g., by creating, editing, approving, or signing the electronic document).

The edges 540 represent connecting events between electronic documents represented by two of the nodes 510. Thus, each edge 540 represents that two electronic documents are related (e.g., different versions, the same type of electronic document, the same electronic document in different file formats, etc.).

As a non-limiting example, the nodes 510-1 through 510-3 represent different versions of the same electronic document at various stages in the process. A person 520-1 creates (530-1) the electronic document 510-1. Changes 540-1 and 540-2 are made to the electronic document to result in electronic documents 510-2 and 510-3, respectively. Each of the electronic documents 510-2 and 510-3 is approved (530-2 and 530-3, respectively) by a person 520-2. The last version of the electronic document 510-3 is signed (530-4) by a person 520-3.

The electronic documents 510-4 through 510-6 represent respective versions of a different electronic document than the electronic documents 510-1 through 510-3. The electronic documents 510-7 and 510-8 represent respective versions of a different, unrelated electronic document, discovered in change data related to the other electronic documents.

It should be noted that the electronic document entity nodes 510 and the changing entity nodes 520 are represented by different items merely for illustrative purposes and without limitation on the disclosed embodiments. It should also be noted that the number of electronic document entity nodes 510, of changing entity nodes 520, and edges 530 and 540 are merely examples and do not limit the disclosed embodiments.

Returning to FIG. 2, at S250, when the document chronology graph has been created, a user request related to electronic document chronology is received. The user request identifies one or more electronic documents for which chronology information is requested and may further indicate one or more specific questions related to the electronic document chronology. Such questions may include, but are not limited to, who edited the document, who approved the document, who edited the document, who created the document, whether two documents are versions of each other, whether two documents have the same type, whether there are related documents for a given document, and the like. Alternatively, the entire electronic document chronology may be requested At S260, a response to the user query is provided based on the document chronology graph. The response may include, but is not limited to, a textual answer to the question, visual content representing the electronic document chronology (e.g., a visual version of the document chronology graph), and the like.

It should be noted that the training and application phases 201 and 202, respectively, are shown as being part of the same process merely for simplicity purposes, but that these phases may be performed separately without departing from the scope of the disclosure. Additionally, in some implementations, these phases may be performed by different entities. For example, the application phase 202 may be performed by the electronic document chronologist 130 of FIG. 1 but may utilize a pre-trained model trained by a different entity (not shown in FIG. 1).

Figure 4:
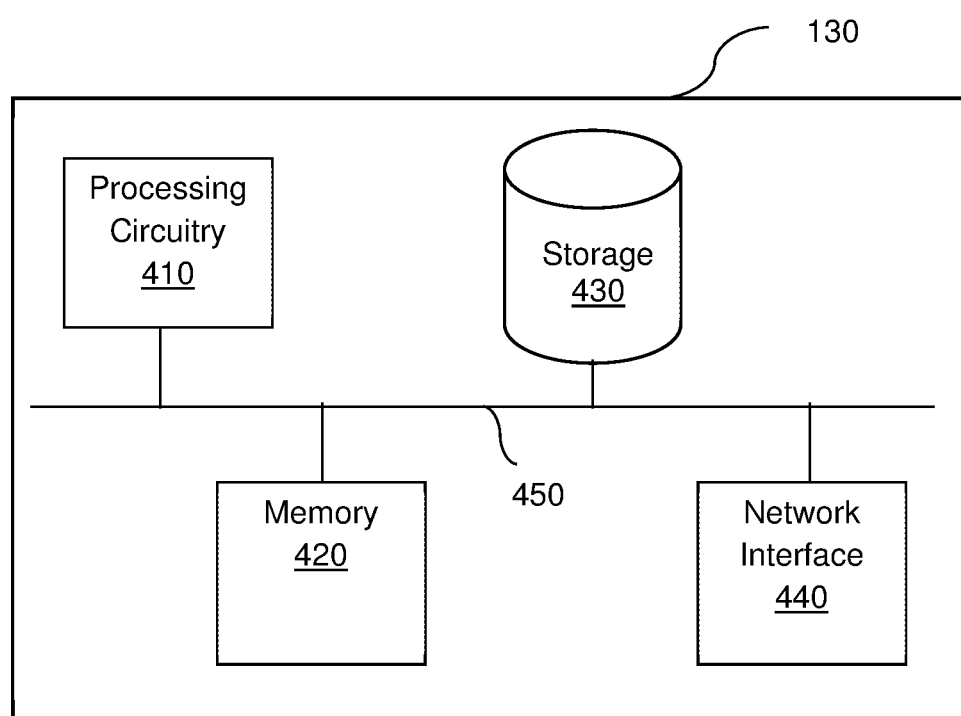
FIG. 4 is a schematic diagram of an electronic document chronologist according to an embodiment.

FIG. 4 is an example schematic diagram of an electronic document chronologist 130 according to an embodiment. The electronic document chronologist 130 includes a processing circuitry 410 coupled to a memory 420, a storage 430, and a network interface 440. In an embodiment, the components of the electronic document chronologist 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the electronic document chronologist 130 to communicate with the user device 120 for the purpose of, for example, sending labeling questions and training data for display, receiving responses to labeling questions, and the like. Further, the network interface 440 allows the electronic document chronologist 130 to communicate with databases for the purpose of retrieving data related to modification of electronic documents.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for creating an electronic document chronology, comprising:
    creating a training data set including second electronic document change data, a plurality of second entity identifiers of a plurality of training entities, and a plurality of labels indicating connecting events between training entities of the plurality of training entities, wherein the training data set is created based on user inputs with respect to a plurality of candidate entity pairs, wherein the plurality of training connections is determined based on the user inputs;
    applying a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities, wherein the machine learning model is trained using the training data set; and
    creating a document chronology graph based on the plurality of connecting events, wherein the document chronology graph includes a plurality of nodes and a plurality of edges, wherein each node represents one of the plurality of entities, wherein each edge represents one of the plurality of connecting events.

2. The method of claim 1, further comprising:
    applying at least one pair filtering rule to a plurality of potential entity pairs to determine the plurality of candidate entity pairs, wherein each potential entity pair includes two of the plurality of training entities.

3. The method of claim 1, further comprising:
    causing a display of a dynamic questionnaire with respect to each of the plurality of candidate entity pairs, wherein a user response to each question of the dynamic questionnaire is used to determine a next question of the dynamic questionnaire, wherein the plurality of labels is determined based on the user response to each question of the dynamic questionnaire.

4. The method of claim 1, further comprising:
    responding to a user query based on the chronology graph, wherein the response to the user query indicates at least one of the plurality of connecting events.

5. The method of claim 4, wherein the user query is directed to the first entity of one of the plurality of connecting events, wherein the response to the user query includes a full electronic document chronology, wherein the full electronic document chronology includes each connecting event of the plurality of connecting events related to the first entity to which the user query is directed.

6. The method of claim 1, wherein the second entity for each connecting event is any of: another electronic document, and an entity that made a change to the first entity.

7. The method of claim 6, wherein at least one of the plurality of connecting events indicates any of: that two electronic documents are different versions of each other, that two electronic documents are of the same type, and that two electronic documents represent the same content in different file formats.

8. The method of claim 6, wherein at least one of the plurality of connecting events indicates any of: a person that created an electronic document, a person that edited an electronic document, a person that approved an electronic document, and a person that signed an electronic document.

9. A non-transitory computer readable medium having stored thereon instructions for causing a processing circuitry to execute a process, the process comprising:
    creating a training data set including second electronic document change data, a plurality of second entity identifiers of a plurality of training entities, and a plurality of labels indicating connecting events between training entities of the plurality of training entities, wherein the training data set is created based on user inputs with respect to a plurality of candidate entity pairs, wherein the plurality of training connections is determined based on the user inputs;
    applying a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities, wherein the machine learning model is trained using the training data set; and
    creating a document chronology graph based on the plurality of connecting events, wherein the document chronology graph includes a plurality of nodes and a plurality of edges, wherein each node represents one of the plurality of entities, wherein each edge represents one of the plurality of connecting events.

10. A system for creating an electronic document chronology, comprising:
   a processing circuitry; and
   a memory, the memory containing instructions that, when executed by the processing circuitry, configure the system to:
   create a training data set including second electronic document change data, a plurality of second entity identifiers of a plurality of training entities, and a plurality of labels indicating connecting events between training entities of the plurality of training entities, wherein the training data set is created based on user inputs with respect to a plurality of candidate entity pairs, wherein the plurality of training connections is determined based on the user inputs;
   apply a machine learning model to an application data set to determine a plurality of connecting events representing a plurality of electronic document changes, wherein each connecting event is between a first entity and a second entity of a plurality of entities, wherein the first entity of each connecting event is an electronic document, wherein the application data set includes first electronic document change data and a plurality of first entity identifiers of the plurality of entities, wherein the machine learning model is trained using the training data set; and
   create a document chronology graph based on the plurality of connecting events, wherein the document chronology graph includes a plurality of nodes and a plurality of edges, wherein each node represents one of the plurality of entities, wherein each edge represents one of the plurality of connecting events.

11. The system of claim 10, wherein the system is further configured to:
   apply at least one pair filtering rule to a plurality of potential entity pairs to determine the plurality of candidate entity pairs, wherein each potential entity pair includes two of the plurality of training entities.

12. The system of claim 10, wherein the system is further configured to:
   cause a display of a dynamic questionnaire with respect to each of the plurality of candidate entity pairs, wherein a user response to each question of the dynamic questionnaire is used to determine a next question of the dynamic questionnaire, wherein the plurality of labels is determined based on the user response to each question of the dynamic questionnaire.

13. The system of claim 10, wherein the system is further configured to:
   respond to a user query based on the chronology graph, wherein the response to the user query indicates at least one of the plurality of connecting events.

14. The system of claim 13, wherein the user query is directed to the first entity of one of the plurality of connecting events, wherein the response to the user query includes a full electronic document chronology, wherein the full electronic document chronology includes each connecting event of the plurality of connecting events related to the first entity to which the user query is directed.

15. The system of claim 10, wherein the second entity for each connecting event is any of: another electronic document, and an entity that made a change to the first entity.

16. The system of claim 15, wherein at least one of the plurality of connecting events indicates any of: that two electronic documents are different versions of each other, that two electronic documents are of the same type, and that two electronic documents represent the same content in different file formats.

17. The system of claim 15, wherein at least one of the plurality of connecting events indicates any of: a person that created an electronic document, a person that edited an electronic document, a person that approved an electronic document, and a person that signed an electronic document.

* * * * *